United States Patent
Kern et al.

(10) Patent No.: US 10,942,754 B2
(45) Date of Patent: Mar. 9, 2021

(54) METHOD FOR DEVELOPMENT AND EXECUTION OF A MACHINE LEARNING MODEL ON A FIELD DEVICE

(71) Applicant: SIEMENS AKTIENGESELLSCHAFT, Munich (DE)

(72) Inventors: Christian Kern, Munich (DE); Igor Kogan, Berlin (DE); Josep Soler Garrido, Munich (DE)

(73) Assignee: Siemens Aktiengesellschaft, Munich (DE)

(*) Notice: Subject to any disclaimer, the term of this patent is extended or adjusted under 35 U.S.C. 154(b) by 0 days.

(21) Appl. No.: 16/492,302

(22) PCT Filed: Mar. 1, 2018

(86) PCT No.: PCT/EP2018/055008
§ 371 (c)(1),
(2) Date: Sep. 9, 2019

(87) PCT Pub. No.: WO2018/166801
PCT Pub. Date: Sep. 20, 2018

(65) Prior Publication Data
US 2020/0012500 A1   Jan. 9, 2020

(30) Foreign Application Priority Data
Mar. 15, 2017   (EP) .................................. 17161110

(51) Int. Cl.
*G06N 20/00* (2019.01)
*G06N 99/00* (2019.01)
*H04L 29/08* (2006.01)
*G06F 8/34* (2018.01)
(Continued)

(52) U.S. Cl.
CPC ............... *G06F 9/445* (2013.01); *G06F 8/34* (2013.01); *G06F 8/35* (2013.01); *G06F 8/60* (2013.01); *G06N 20/00* (2019.01)

(58) Field of Classification Search
CPC .......... G06F 8/35; G06F 8/10; G06F 16/9024; G06F 16/13; G06F 16/188;
(Continued)

(56) References Cited

U.S. PATENT DOCUMENTS 8,015,543 B1   9/2011   Carrick
9,672,474 B2 *   6/2017   Dirac ..................... G06N 20/00
(Continued)

OTHER PUBLICATIONS

E. Chioasca, Using machine learning to enhance automated requirements model transformation, 4 pages (Year: 2012).*
(Continued)

*Primary Examiner* — Thuy Dao
(74) *Attorney, Agent, or Firm* — Lempia Summerfield Katz LLC (57) ABSTRACT

A method for deployment of a machine learning model (MLM) on a target field device is disclosed herein. The method includes automatically generating a set of source code files based on the machine learning model, wherein the set of source code files is configured to execute the machine learning model according to predetermined capabilities of the target field device; transforming the generated source code files into a model binary using a tool chain specific to the target field device; and deploying the model binary in a memory of the target field device.

20 Claims, 7 Drawing Sheets

(51) Int. Cl.
*G06F 9/445* (2018.01)
*G06F 8/35* (2018.01)
*G06F 8/60* (2018.01)

(58) Field of Classification Search
CPC .. G06F 16/2379; G06F 11/3466; G06F 9/445; G06F 8/34; G06F 8/60; G06N 20/00; G06N 5/04; G06N 5/02; G06N 3/0454; G06N 3/08; G06N 3/084
See application file for complete search history.

(56) References Cited

U.S. PATENT DOCUMENTS

| | | | | |
|---|---|---|---|---|
| 10,318,882 | B2* | 6/2019 | Brueckner | G06N 20/00 |
| 10,452,992 | B2* | 10/2019 | Lee | G09B 5/00 |
| 2013/0125093 | A1 | 5/2013 | Mandava | |
| 2013/0282746 | A1* | 10/2013 | Balko | G06Q 10/06 |
| | | | | 707/758 |
| 2017/0178027 | A1* | 6/2017 | Duggan | G06F 9/50 |
| 2017/0316114 | A1* | 11/2017 | Bourhani | G06F 3/0482 |
| 2019/0012257 | A1* | 1/2019 | Indurthivenkata | |
| | | | | G06F 11/3604 |

OTHER PUBLICATIONS

European Search Report for European Patent Application No. 17161110.6-1879 dated Sep. 19, 2017.
PCT International Search Report and Written Opinion of International Searching Authority, corresponding to PCT International Application No. PCT/EP2018/055008 dated May 15, 2018.

* cited by examiner

METHOD FOR DEVELOPMENT AND EXECUTION OF A MACHINE LEARNING MODEL ON A FIELD DEVICE

The present patent document is a § 371 nationalization of PCT Application Serial No. PCT/EP2018/055008, filed Mar. 1, 2018, designating the United States, which is hereby incorporated by reference, and this patent document also claims the benefit of European Patent Application No. 17161110.6, filed Mar. 15, 2017, which is also hereby incorporated by reference.

TECHNICAL FIELD

The disclosure relates to a method for deployment and execution of a machine learning model on a field device, in particular, on a memory restricted industrial field device such as a programmable logic controller PLC.

BACKGROUND

Electronic industrial field devices, (e.g., digital protection relays or programmable logic controllers PLC), are built for reliability and may make use of high-end components, in particular, high end memory components like non-volatile RAM or other types of battery-backed RAM or dedicated retentive memories able to prevent data loss for example in case of power failures. Programs running on such industrial field devices tend not to require large amounts of main memory but offer real-time guarantees. Therefore, field Devices hosting these programs operate in real-time, e.g., they perform actions within strict time budgets. For instance, an electronic field device may trigger a protection mechanism within an electrical power supply grid or may control certain manufacturing acts in a manufacturing process within a predetermined time. Accordingly, there are strict deadlines to complete execution of the program running on a processing unit of the field device. Field devices also take part in safety critical applications and therefore operate in real-time with strict time budgets.

Field devices include only limited available physical resources for deployment and execution of programs. The memory space of the main memory available in these field devices may be very small (e.g., 1 to 20 MB) compared to devices used in non-industrial non-real-time computing environments. Further, the program and software run on such field devices have to meet strict quality requirements. In order to meet these requirements, programs run on field devices may be developed in low-level programming languages such as C/C++ and are then manually optimized and verified by trained software and firmware developers.

On the other hand, machine learning, ML, presents a different paradigm whereby computers are able to learn and develop programs without being explicitly programmed. In this context, developers equipped with various software tools are able to automatically produce machine learning models from sets of training data. For example, a developer may want to provide a machine learning model to estimate the distance of a failure on an electrical power supply grid based on a raw electrical current and voltage data from previous power supply failures. The developer may in this case design a machine learning model. This machine learning model may include a computation graph defining a sequence of operations to be performed on the received raw data, for example, coming from sensors or measurement devices on field devices. The machine learning model may contain a certain number of parameters that have to be learned from the received data. Once the machine learning model has been trained with training data, the model may be brought into operation. This means, the same sequence of operations together with automatically learned parameters may be applied to the received new raw data in order to classify them. For instance, the raw data may include data coming from subsequent electrical faults in a power supply grid and the machine learning model may be used to estimate the location of the faults within the electrical power supply grid.

After machine learning models are developed, they are brought into operation. This is conventionally achieved by first generating a full description of the algorithm (including all operations and parameters) in a serialized format (for example, using XML or json format, or a similar binary or text-based representation), and deploying the serialized model to the device of interest (e.g., a field device). In the field device, an interpreter program is able to interpret the serialize representation, and perform the operations described on local data. This is inefficient and unsuitable for embedded systems and industrial field devices for different reasons. A disadvantage of this conventional approach is the need for a model interpreter module itself. These modules may use system resources in amounts which are unsuitable for field-devices as described above. This inefficiency in resource utilization is related to the fact that interpreters are able to parse a potentially wide range of machine learning models. In practice, however, machine learning models running on field devices at any given time only require a subset of the functionality provided by a model interpreter, therefore leading to an inefficient use of system resources. Further, model interpreters used in the conventional approach are developed in many cases in high-level programming languages, like Python, or language producing programs running on a virtual machine or interpreter, like Java. This facilitates the development of flexible interpreters able to understand a wide variable of machine learning models but presents many disadvantages such as non-efficient use of resources or non-deterministic execution time which may be required for real-time systems. They may make use of services from an operating system which are not available on some embedded devices like PLC controllers, such as requests for additional memory during run-time (e.g., dynamic memory allocation) or handling of exception. Further, the non-deterministic resource utilization makes the programming languages used in the conventional approach unsuitable for real-time applications.

A further conventional approach involves the manual coding and optimization of a machine learning program implementing a trained model. However, this is very cumbersome and causes high efforts in development and testing of the system, especially when the machine learning model has to be updated frequently.

A further alternative approach involves the extraction of raw data from the field device to which the machine learning model has to be applied and to send the extracted raw data to another device where a model interpreter module may be executed without restrictions. The device with the model interpreter module may be connected via many different kinds of interfaces to the field device operating in real-time. The main disadvantage of this conventional approach is that it provides an additional latency incurred to extract the data from a field device, and to feed the results produced by the machine learning model back to the field device.

SUMMARY AND DESCRIPTION

The scope of the present disclosure is defined solely by the appended claims and is not affected to any degree by the statements within this summary. The present embodiments may obviate one or more of the drawbacks or limitations in the related art.

It is an object of the present disclosure to provide a method and apparatus to deploy and execute a machine learning model on a field device efficiently.

This object is achieved according to a first aspect by a method for deployment of a machine learning model on a target field device including the acts of: generating automatically a set of source code files on the basis of the machine learning model, wherein the set of source code files is adapted to execute the machine learning model according to predetermined capabilities of the target field device; transforming the generated source code files into a model binary using a tool chain specific to the target field device; and deploying the model binary in a memory of the target field device.

In a possible embodiment of the method, the machine learning model is parsed by a model parser to generate automatically at least one source code file and to extract parameters of the machine learning model.

In a further possible embodiment of the method, the machine learning model is represented by a serialized model including a text or binary string which encodes a graph topology including nodes, operation of nodes, interconnection of nodes, and parameter of nodes.

In a still further possible embodiment of the method, the extracted parameters of the machine learning model are included into a source code of at least one generated source code file as constants and/or static variables.

In a still further possible embodiment of the method, the extracted parameters of the machine learning model are included into a separate parameter binary which is deployed along with the model binary in a memory of the target field device.

In a still further possible embodiment of the method, the extracted parameters of the machine learning model are included into a separate parameter file which is transformed into a parameter binary using the tool chain specific to the target field device, wherein the parameter binary is combined with the model binary for deployment in a memory of the target field device.

In a further possible embodiment of the method, the model binary and/or parameter binary are deployed locally by copying them from the tool chain into a memory of the target field device or remotely by copying them via a network and a network interface of the target field device into a memory of the target field device.

In a still further possible embodiment of the method, the machine learning model used for generating the source code files includes a machine learning model trained with training data and/or tested with test data.

In a still further possible embodiment of the method, the machine learning model is parsed by a model parser having access to a database including a set of libraries and device compatible operation modules of the target field device.

In a still further possible embodiment of the method, the model binary and parameter binary are stored in a non-volatile memory of the target field device and loaded into a main memory of the target field device for execution by at least one processing unit of the target field device.

The disclosure further provides, according to a second aspect, a deployment system for deployment of a machine learning model on a target field device, wherein the deployment system includes: a model parser configured to parse the machine learning model to generate at least one source code file configured to execute the machine learning model using available resources of the target field device; and a tool chain specific to the target field device configured to transform the at least one source code file into a model binary for deployment in a memory of the target field device.

In a possible embodiment of the deployment system, the model parser has access to a database including a set of libraries and device-compatible operation modules of the target field device.

In a further possible embodiment of the deployment system, the model parser is configured to extract parameters of the machine learning model and to include them into a source code of at least one generated source code file as constants and/or static variables.

In a further possible embodiment of the deployment system, the model parser is configured to extract parameters of the machine learning model and to include them into a separate parameter binary which is deployed along with the model binary in a memory of the target field device.

In a still further possible embodiment of the deployment system, the model parser is configured to extract parameters of the machine learning model and to include them into a separate parameter file which is transformed into a parameter binary using the tool chain specific to the target field device, wherein the parameter binary is deployed along with the model binary in a memory of the target field device.

The disclosure further provides, according to a third aspect, a method for executing a machine learning model on a field device including executing basic operations of the machine learning model divided into operation groups of basic operations according to a schedule, wherein basic operations of an operation group are executed while model parameters of a subsequent operation group are loaded.

In a possible embodiment of the method, the basic operations are executed depending on a precalculated set of execution configurations.

In a further possible embodiment of the method, basic operations of an operation group are executed by at least one processing unit of the field device while model parameters of a subsequent operation group are loaded simultaneously from a non-volatile memory unit of the field device into a main memory of the field device.

In a further possible embodiment of the method, the execution configuration includes one or more of the following: a placement of operation nodes of the machine learning model into operation groups of basic operations, a sequence of execution of operation nodes and/or operation groups; a selection of an amount of input and/or output batching to be performed between operation nodes of the machine learning model; and a location on a non-volatile memory of the field device for model parameters corresponding to operation nodes on each operation group.

In a still further possible embodiment of the method, the set of execution configurations are precalculated on the basis of a graph topology of the machine learning model including dependencies between operation nodes of the machine learning, ML, model, an available program memory of the field device, and/or an admissible execution latency, and/or a load time for loading model parameters from a memory unit of the field device into a processing unit of the field device and/or on the basis of an execution time of basic operations for each operation node of the machine learning model on the field device.

In a still further possible embodiment of the method, the model parameters of a subsequent operation group are loaded into a main memory of the field device in response to load requests issued by a machine learning program implementing the machine learning model executed by a processing unit of the field device.

In a still further possible embodiment of the method, the method is performed by at least one processing unit of the field device in real time.

In a still further possible embodiment of the method, the machine learning model includes: an artificial neural network; a convolutional neural network; a recurrent neural network; multilayer perceptrons; a decision tree mode; and/or a random forest model.

The disclosure further provides according to a fourth aspect a field device including: a memory unit storing model parameters of a machine learning model; and a processing unit configured to execute basic operations of the machine learning model divided into operation groups of basic operations according to a schedule, wherein basic operations of an operation group are executed by the processing unit while model parameters of a subsequent operation group are loaded from the memory unit of the field device.

In a possible embodiment of the field device, the processing unit is programmed to execute the basic operations depending on a precalculated set of execution configurations.

In a still further possible embodiment of the field device, the set of execution configuration includes at least one of the following: a placement of operation nodes of the machine learning model into operation groups of basic operations; a sequence of execution of operation nodes and/or operation groups; a selection of an amount of input and/or output batching to be performed between operation nodes of the machine learning model; a location on a non-volatile memory unit of the field device for model parameters corresponding to operation nodes of each operation group.

In a further possible embodiment of the field device, the field device includes a memory controller programmed to load model parameters of a subsequent operation group from the memory unit of the field device into a main memory of the field device in response to received load requests issued by a machine learning program implementing the machine learning model and executed by a processing unit of the field device.

In a possible embodiment of the field device, the memory unit storing model parameters of the machine learning model is a non-volatile memory.

In a further possible embodiment of the field device, the field device includes a programmable logical controller.

In a still further possible embodiment of the field device, the field device includes a digital protection relay.

The disclosure further provides a program including instructions for performing a method for executing a machine learning model on a field device according to the third aspect of the present disclosure.

BRIEF DESCRIPTION OF THE DRAWINGS

In the following, possible embodiments of the different aspects of the present disclosure are described in more detail with reference to the enclosed figures.

DETAILED DESCRIPTION

Figure 1:
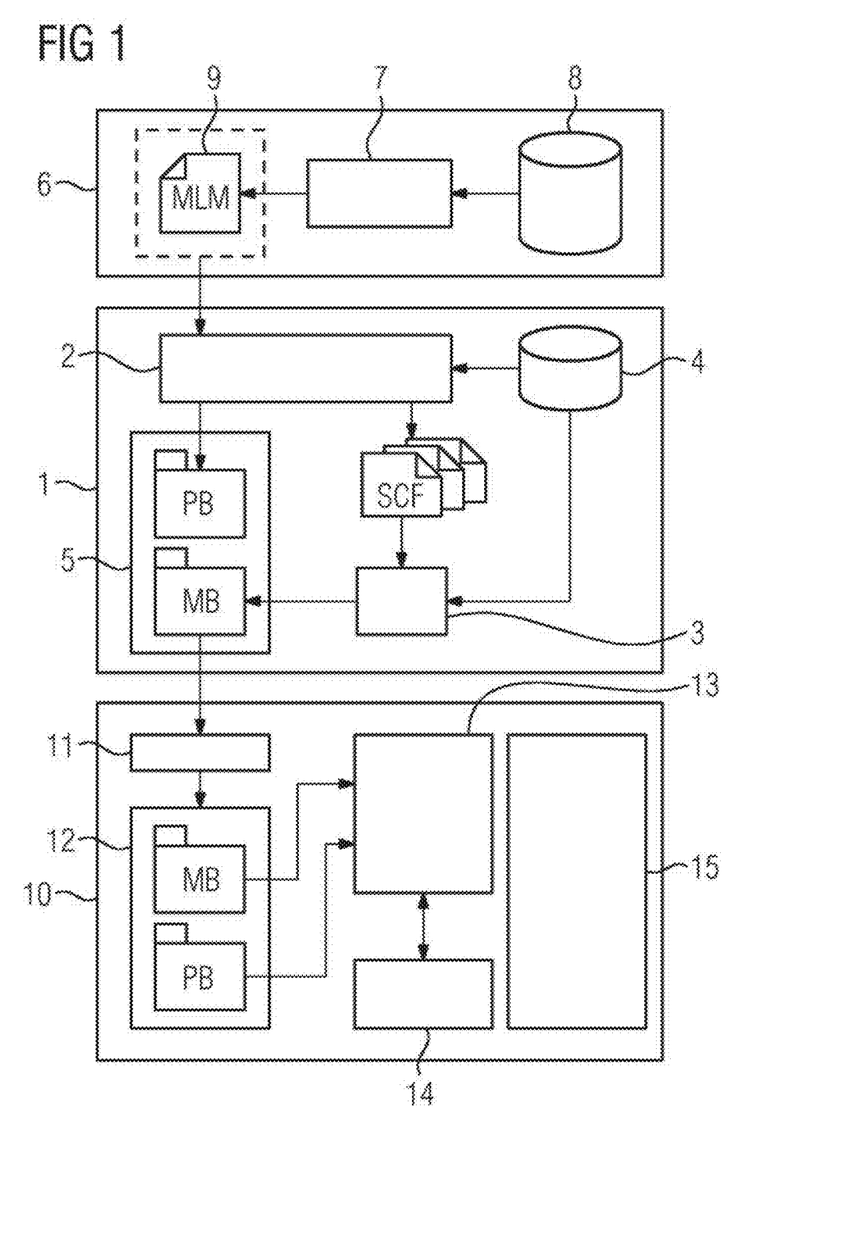
FIG. 1 depicts a possible exemplary embodiment of a system for deployment and executing a machine learning model on a target field device.

FIG. 1 depicts a schematic block diagram for illustrating a possible exemplary embodiment of a system for deployment and execution of a machine learning model MLM on a target field device. The deployment system 1 illustrated in FIG. 1 includes a model parser 2 and a tool chain 3 specific to a target field device. The model parser 2 is configured to parse a machine learning model MLM to generate automatically at least one source code file SCF. As illustrated in FIG. 1, the model parser 2 is configured to parse a trained machine learning model to generate automatically a set of source code files SCF. The source code file SCF is configured to execute the machine learning model MLM using available resources of a target field device 10. The tool chain 3 of the system 1 is specific for the target field device and is configured to transform the at least one source code file SCF into a model binary MB for deployment in a memory of the target field device. The tool chain 3 may include in a possible embodiment a compiler, a linker, a debugger and an archiver. As illustrated in FIG. 1, the model parser 2 has access to a database 4. The database 4 may include in a possible implementation a set of libraries and device-compatible operation modules of the respective target field device. The operation modules are compatible to the target field device 10 but may still be generic in the sense that they are suitable for different field devices.

In a possible first variant of the parsing and deployment system 1 illustrated in FIG. 1, the model parser 2 is configured to extract parameters P of the machine learning model MLM and to include the extracted parameters into the source code of at least one generated source code file SCF as constants or static variables. In an alternative embodiment, the model parser 2 is configured to extract parameters of the machine learning model MLM and to include them into a separate parameter binary PB which is deployed along with the model binary MB in a memory of the target field device 10. The variant reduces the amount of required memory but has a performance penalty.

In a still further third variant of the deployment system 1, the model parser 2 is configured to extract parameters of the machine learning model MLM and to include them into a separate parameter file PF which is transformed into the parameter binary PB using the tool chain 3 specific to the target field device. The parameter binary PB is then deployed along with the model binary MB in the memory of the target field device 10. The model binary MB and the parameter binary PB may be stored temporarily in a memory 5 of the parsing and deployment system 1 as illustrated in FIG. 1.

Figure 4:
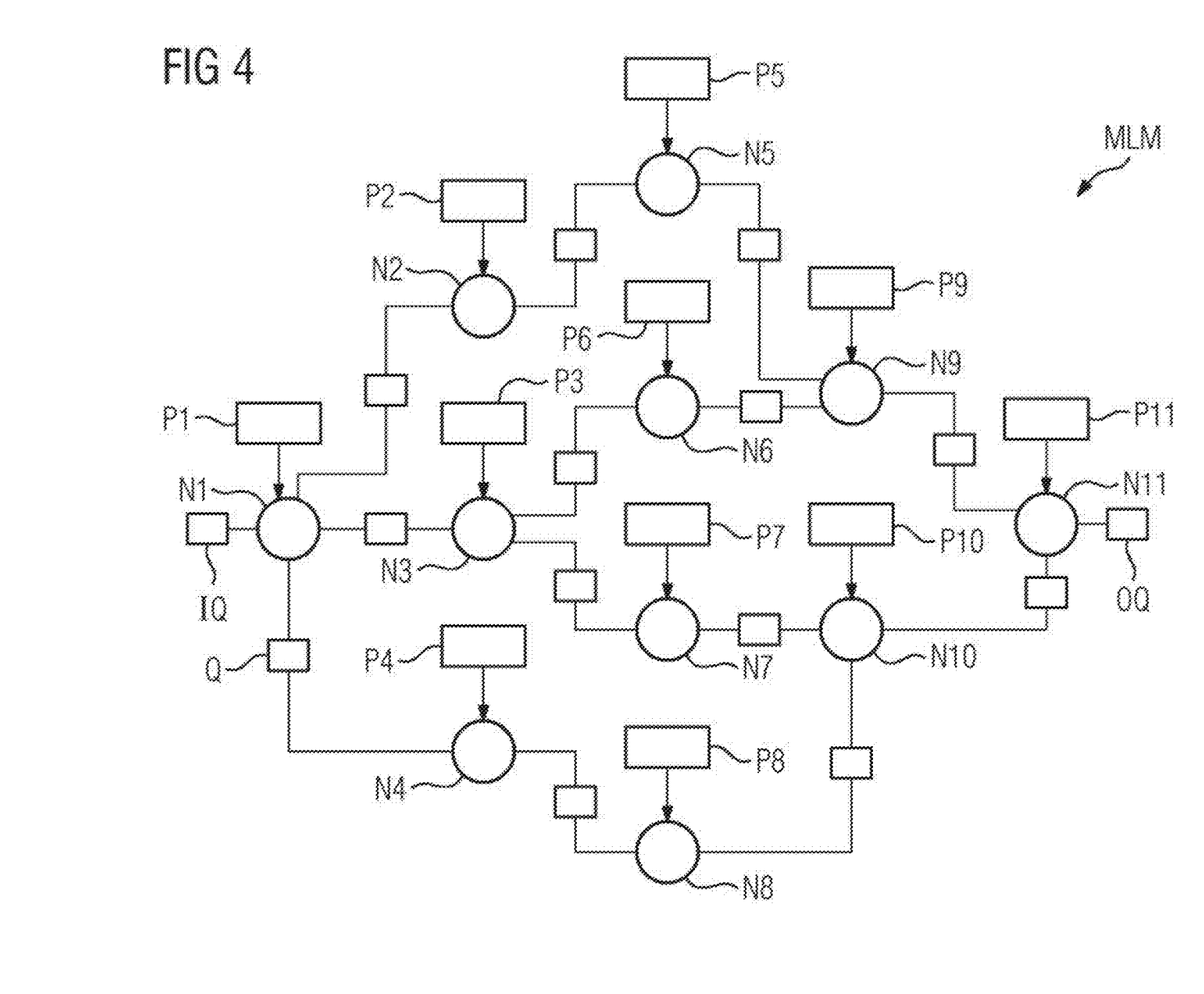
FIG. 4 depicts a schematic graph for illustrating a possible exemplary embodiment of a machine learning model.

The machine learning model MLM is a trained machine learning model MLM trained within a training system 6. The training system 6 includes a machine learning model training module 7 receiving training and/or testing data from a data source 8. The machine learning model MLM is trained by the module 7 with the received training data and then tested with test data. The trained machine learning model MLM may be stored temporarily in a memory 9 of the training system 6 as illustrated in FIG. 1. The training of the machine learning model MLM may be performed independently from the target field device. The machine learning model MLM may be trained in a model training environment and may then be applied to the parsing and deployment system 1 as shown in FIG. 1. The machine learning model MLM is represented by a serialized model including a text or binary string which encodes a graph topology including nodes, operation of nodes, interconnection of nodes and/or parameter of nodes. An exemplary machine learning model MLM is illustrated in FIG. 4. The parsing and the deployment system 1 is configured to take a serialized representation of the machine learning model MLM which may be provided by a conventional model training tool and to transform it into a source code automatically. Accordingly, a user or developer does not need to produce a source code. Only a serialized machine learning model MLM has to be provided with possibly additional parameters such as names and sizes of input and/or output nodes of the machine learning model MLM. The machine learning model MLM may be represented by a computation graph such as illustrated in FIG. 4. In the illustrated diagram, different nodes N represented by circles may perform operations on input data from queues Q represented by boxes and place the calculated result in output queues for the following nodes to continue processing. The operations themselves depend on a series of parameters P which may be automatically learned from received data. The machine learning model MLM provided by the training system 6 may be exported by the training system 6 as a serialized binary or text (XML, JSON) object containing the structure and operations of the computation graph as well as the learned parameters and may include optionally model metadata such as version numbers, units or signatures. The model parameters illustrated in the exemplary diagram of FIG. 4 may for instance include weight coefficients.

The machine learning model MLM is parsed by the model parser 2 of the parsing and deployment system 1 to generate automatically a set of source code files SCF including at least one source code file and to extract parameters of the machine learning model MLM. The machine learning model MLM is a serialized model that includes a text and/or binary string which encodes a description graph topology, nodes, operations and parameters, etc. that represent the machine learning model MLM.

In a possible embodiment, the extracted parameters of the machine learning model MLM are included into a source code of the at least one generated source code file SCF as constants and/or static variables. Alternatively, the extracted parameters of the machine learning model MLM are included into a separate parameter binary PB which is deployed along with a model binary MB into a memory of the target field device. In a further possible alternative embodiment, the extracted parameters of the machine learning model MLM are included into a separate parameter file PF which is transformed into a corresponding parameter binary PB using the tool chain 3 specific to the target field device. The parameter binary PB is then combined with the model binary MB for deployment in a memory of the target field device.

In a possible embodiment, the model binary MB and/or parameter binary PB are deployed locally by copying them from the parsing and deployment system 1 into a memory of the target field device. The tool chain 3 includes programs that receive a source code and generate automatically a software program. The last processing act of the tool chain 3 may place the resulting binary into a memory 5 of the parsing and development system. The memory 5 may be a disc of a machine where the tool chain 3 is implemented.

In a further possible embodiment, the model binary MB and/or parameter binary PB may also be copied from the parsing and deployment system 1 via a network and a network interface of the target field device 10 into a local memory of the target field device 10. It does not need to be transferred directly from the parsing and deployment system to the target field devices. It may be placed in some intermediate repository or system in charge of performing updates on the field device.

The model binary MB and parameter binary PB may be stored in a possible embodiment in a non-volatile memory 12 of the target field device 10 and then loaded into a main memory 13 of the target field device 10 for execution by at least one processing unit 14 of the target field device 10.

FIG. 1 illustrates a possible exemplary embodiment of a target field device 10 according to an aspect of the present disclosure. In the illustrated exemplary embodiment, the target field device 10 includes an interface 11, a processing unit 14 such as a CPU. Further, the target field device 10 may include input and/or output interfaces 15. In a possible embodiment, the non-volatile memory 12 may be connected to the central processing unit 14 via a memory controller.

Figure 2:
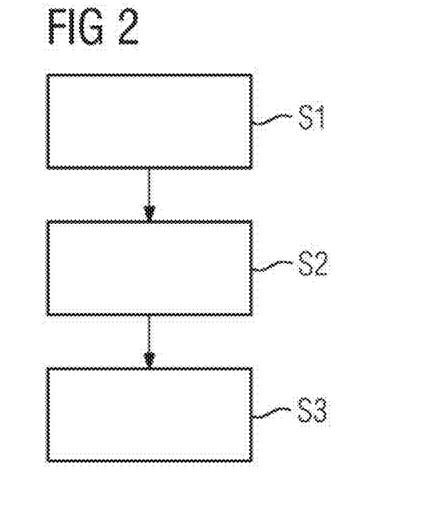
FIG. 2 depicts a flowchart of a possible exemplary embodiment of a method for deployment of a machine learning model on a target field device.

FIG. 2 depicts a possible exemplary embodiment of a method for deployment of a machine learning model MLM on a target field device 10 according to the first aspect of the present disclosure.

In a first act S1, a set of source code files SCF is generated automatically on the basis of the machine learning model MLM provided by the training system 6. The set of source code files SCF is configured to execute the machine learning model MLM according to predetermined capabilities of the target field device 10.

In a further act S2, the generated source code files SCF are transformed into a model binary MB using the tool chain 3 specific to the target field device 10.

Finally, the model binary MB is deployed in act S3 in a memory 12 of the target field device 10. This memory 12 may be a non-volatile memory.

In act S1, an automatic transformation of the machine learning model MLM into a source code is performed. The model parser 2 of the parsing and deployment system 1 goes through the serialized model object and replicates the computation graph topology into a syntax suitable to be compiled in a low-level language for the target field device 10, e.g., C/C++. The resulting source code files SCF effectively implement a standalone module where instructions and operations are instantiated in a sequence such that they result in the same computation graph as the exported machine learning model MLM. The generated program is optimized to execute the individual machine learning model MLM from which it is generated. The method as illustrated in the flowchart of FIG. 2 may be performed in the development environment of the target field device 10. It is different from the execution environment of the device 10 itself and may also be different to the environment used to train the machine learning model MLM.

The model parser 2 of the system 1 as illustrated in FIG. 1 may make use of information about a set of libraries and modules available for the respective target field device 10, e.g., operations performed and interfaces. The model parser 2 has knowledge about device-specific modules for operations such as matrix multiplications, convolutions, non-linear functions, etc. which may be building blocks of machine learning models MLM. These libraries may be pre-implemented once in an optimized way for the deployment system 1 according to the above-mentioned qualities and requirements and may be re-used for every new machine learning model MLM that has to be deployed.

In a subsequent act S2 after the source code generation in act S1, a computer program is automatically built, (e.g., compiled and linked), from the auto-generated source code files SCF and the device-specific libraries and modules, using the tool chain 3 suitable for the target device 10. The result is a standalone binary program MB which may be executed on the field device 10. The generated model binary MB is deployed in act S3 in the memory of the target field device 10. A variation of this deployment alternative would be that the machine learning module is integrated into the firmware of the target device 10. In this case, the auto-generated source code is not given directly to a toolchain. Instead, the generated code is integrated with other source code implementing other functions of the field device 10. This integration may take place for example in a configuration management tool. Then all the source code (auto-generated ML code and unrelated, general device source code) is compiled/linked with the toolchain into a single binary, and this binary (implementing all the device functions) is deployed onto the device using conventional firmware update mechanisms.

Model parameters of the machine learning model MLM may be parsed in different ways. One alternative is to include them directly in this generated source code of the source code file SCF. For example, they are added to the source code files as initialized static variables and constants. In this way, they form part of the resulting model binary MB after the building act. Alternatively, the extracted parameters may be placed during the parsing in separate objects such as binary files.

With the method as illustrated in FIG. 2, the machine learning model MLM is transformed automatically into a suitable form for deployment on resource-constrained target field devices 10 running real-time applications. The target field device 10 as illustrated in FIG. 1 receiving a model to be deployed from the parsing and deployment system 1 may be for instance a programmable logical controller PLC or an electrical grid digital protection relay.

The generated model binary MB deployed in the memory of the target field device 10 has the advantage that it uses only the required system resources of the target field device 10 to implement the machine learning model MLM of interest. Further, the deployed model binary MB complies with run-time policies imposed by the target system or target device 10. For example, no additional memory requests to the operating system after program start are necessary and there is no exception throwing. Further, no extensive manual code development is required.

Figure 3:
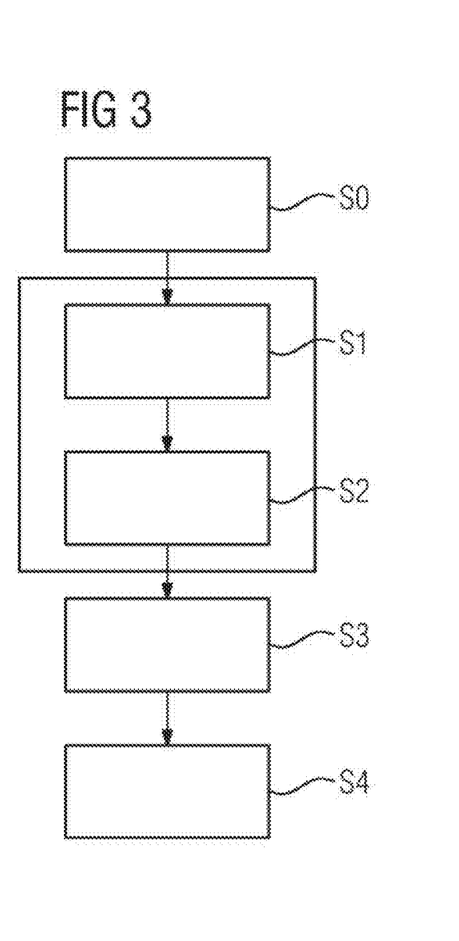
FIG. 3 depicts a further flowchart for illustrating a further possible exemplary embodiment of a method for deployment and execution of a machine learning model on a target field device.

FIG. 3 depicts a block diagram of a further possible embodiment for deployment and execution of a machine learning model MLM on a target field device 10. In the illustrated exemplary embodiment, a training act S0 is performed previous to the generation of the source code files SCF in act S1. Further, after a deployment of the module binary MB in the memory of the target field device 10 in act S3, the model binary MB is loaded in act S4 into a main memory 3 of the target field device 10 for execution.

Different deployment alternatives exist once the model binary MB and the parameter binary PB have been produced. Physically, the deployment may take place locally by copying a file from a storage medium physically attached to the device or remotely e.g., via a network interface. Logically, the model may be deployed in various forms, such as integrated with a full firmware update, as a standalone library or as an executable binary. In the latter case, the functionality implemented by the model may be offered to customers as a standalone application which may be updated as improved models become available.

The deployment may take place to a non-volatile memory of the target field device 10 or a similar permanent storage facility such as a disk drive. After this point, execution of the model in a standalone mode (without the need for a generic model interpreter capable of scoring/executing multiple different models) may take place. When starting the program, the model binary MB is initially placed into the main memory 13 by a loader. If the model parameters are contained within the model binary MB, no further transfer of information to the main memory 13 is required from the non-volatile memory 12 of the target field device 10.

The machine learning model MLM may be executed on the target field device 10 by a processing unit with a lower and predictable amount of required system resources.

The method illustrated in the flowcharts of FIGS. 2, 3 provides several advantages. Model training and testing may take place with standard tools independent of the restrictions and required software imposed by the target device 10. Further, the resulting program is guaranteed to run on the target device 10, e.g., it is possible to guarantee that all its dependencies are satisfied and that it complies with the requirements of the target device 10. Moreover, the resulting program is sufficient in the use of system resources and may be deployed in a standalone manner. It may contain exclusively the instructions and data required for evaluation of a single model. Hence, it does not require a generic model interpreter running on the target device 10. Further, the resulting program may be made suitable for real-time applications because it uses a fixed amount of resources and has a predictable execution time. An update of the machine learning models may be streamlined requiring in most cases no manual code development for a development and update of new machine learning models MLM.

Figure 5:
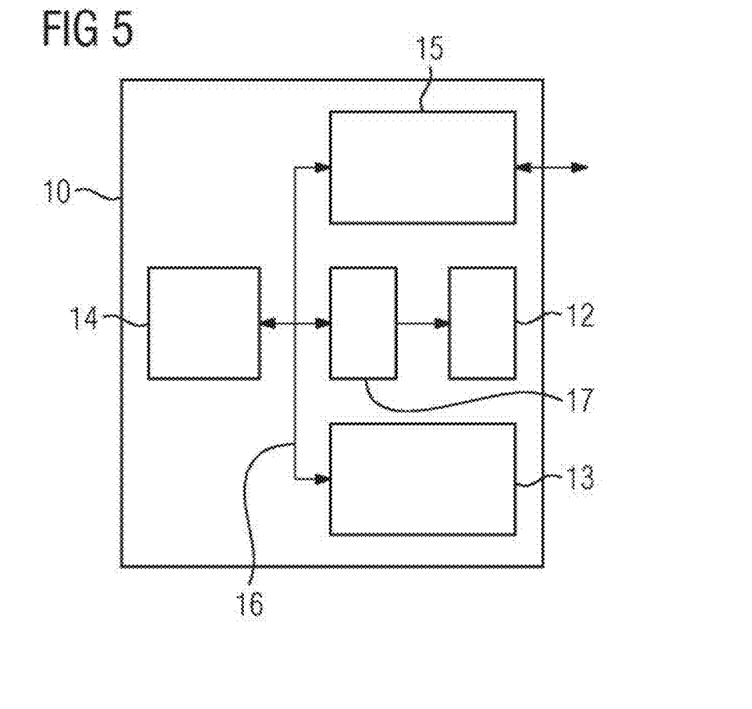
FIGS. 5, 6 illustrate block diagrams for illustrating possible exemplary embodiments of field devices.
Figure 6:
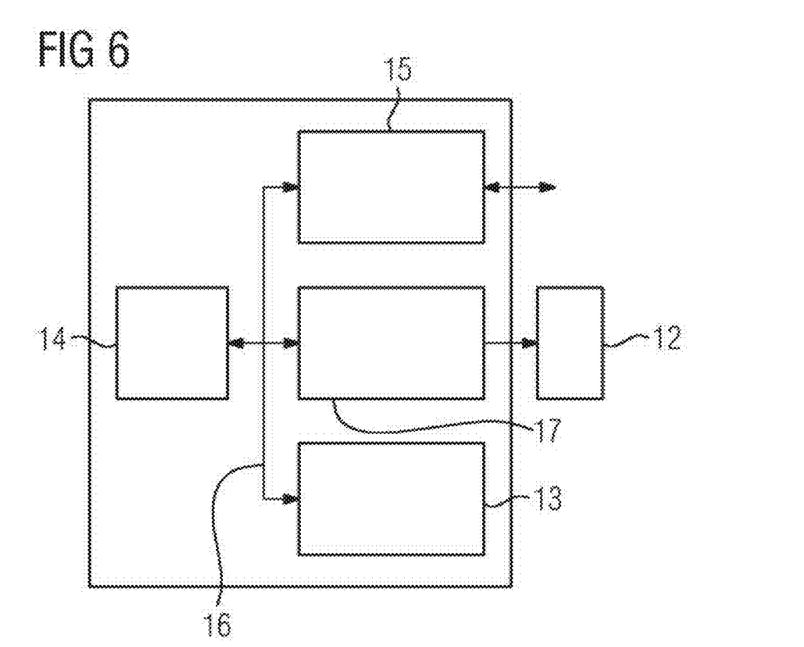

The disclosure provides according to a further aspect a method for executing a machine learning model MLM on a field device such as a field device 10 as illustrated in FIG. 1. Further exemplary embodiments of the field device 10 are shown in FIGS. 5, 6. The method for executing a machine learning model MLM on a field device 10 includes executing basic operations of the machine learning model MLM divided into operation groups of basic operations according to a schedule. The basic operations of an operation group are executed while model parameters of a subsequent operation group are loaded.

The basic operations are executed depending on a pre-calculated set of execution configurations. The basic operations of an operation group may be executed by at least one processing unit such as the processing unit 14 illustrated in FIG. 1 of the field device 10 while model parameters of a subsequent operation group are loaded simultaneously from a non-volatile memory unit of the field device 10, such as the non-volatile memory 12, into a main memory of the field device 10, such as the main memory 13 illustrated in FIG. 1.

The precalculated set of execution configurations may include one or more of the following: a placement of operation nodes of the machine learning model MLM into operation groups of basic operations, a sequence of execution of operation nodes and/or operation groups, a selection of an amount of input and/or output batching to be performed between operation nodes of the machine learning model MLM and/or a location on a non-volatile memory 12 of the field device 10 for model parameters corresponding to operation nodes of each operation group.

In a possible embodiment of the method for executing a machine learning model MLM on a field device 10, the set of execution configurations is precalculated on the basis of a graph topology of the machine learning model MLM including dependencies between operation nodes N of the machine learning model MLM, an available program memory of the field device 10 and/or an admissible execution latency and/or a load time for loading model parameters P from a memory unit of the field device 10 into a processing unit 14 of the field device 10 and/or an execution time of basic operations for each operation node of the machine learning model MLM of the field device 10. In a possible embodiment, the model parameters P of a subsequent operation group are loaded into the main memory 13 of the field device 10 in response to load requests issued by a machine learning program implementing the machine learning model MLM and executed by a processing unit 14 of the field device 10. A load request is issued by the machine learning program running on the CPU 14 of the target field device 10. There may be a module in charge of implementing the schedule, e.g., coordinate the execution of operation groups and the loading of operation parameters P according to the schedule. In the illustrated embodiment of FIG. 1, the target field device 10 includes a single processing unit 14. In an alternative embodiment, the target field device 10 may also include multiple processing units, for example a multicore system or a system with additional processing units such as Graphics Processing Units (GPU) or Field Programmable Gate Arrays (FPGA). The method is performed by at least one processing unit 14 of the field device 10 in real time.

The used machine learning model MLM may include different kinds of machine learning models MLM, in particular an artificial neural network, a convolutional neural network CNN, a recurrent neural network RNN, multilayer perceptrons, a decision tree model and/or a random forest model. In a possible embodiment, the machine learning model MLM may itself be a combination, e.g., ensemble of multiple different models.

The machine learning model MLM may be represented by a computation graph as illustrated in FIG. 4. The nodes N of the machine learning model MLM represented by circles are configured to perform operations of input data received from input queues Q and place the results of the operation in output queues for the next layer of nodes to continue processing. Operations performed by the nodes N may be depend on a series of parameters, for instance weighting coefficients. The parameters may be learned automatically from data.

The parameters P associated to the operation nodes N require memory resources on the target field device 10 which executes the model. The same applies to the queues Q between the operation nodes N which may be designed to provide capacity for multiple input output values. Additionally, the instructions to be performed by the operation nodes N as well as their internal variables also require system memory.

The field device 10 which is used to run the model may include a main memory 13 and a non-volatile memory 12 as depicted in the embodiments of FIGS. 5, 6. The main memory 13 may be fast, but also costly and provide limited memory space. The main memory 13 may be based on technologies such as SRAM or DRAM including non-volatile or battery-packed versions. The main memory 13 may communicate with the processing unit 14 of the target field device 10 which executes programs, for example via a system bus 16 as illustrated in FIGS. 5, 6.

The non-volatile memory 12 may be internal to the target device 10 as illustrated in FIG. 5 or may be external as illustrated in the embodiment of FIG. 6. In the embodiment of FIG. 6, the non-volatile memory 12 may be implemented by a memory card such as SD cards or CFAST cards. The target device 10 may also include both types of memory cards. The non-volatile memory 12 may be less costly than the main memory 13. It may be based on different technologies, for instance NAND or NOR flash memory. It presents certain disadvantages compared to the main memory 13 including slow read times, slow write times and a limited lifespan due to erase and write cycles. In a possible embodiment, the non-volatile memory 12 may be connected to the processing unit 14 of the target field device 10 via a memory controller 17 as shown in FIGS. 5, 6. The memory controller 17 receives requests or commands from the processing unit 14, for example via the same system bus 16. The memory controller 17 may be requested to provided certain pages or blocks from the non-volatile memory 12 to the processing unit 14 or to copy them directly to a certain area of the main memory 13 without CPU involvement, e.g., by using a DMA mechanism. The memory controller 17 is configured to interpret requests and manages the memory accordingly in order to perform the requests. This communication may take place using several serial or parallel interfaces specific to the memory type such as SPI or SD interfaces. An access to many types of non-volatile memories cannot be done on an individual byte basis but may be performed in predetermined block sizes. For instance, NAND flash memory (e.g., used in memory cards) operations are performed in pages or blocks of certain size, wherein the size in turn depends on the nature of the operations themselves (e.g., read, write, erase). Placement of model parameters in the memory and access during model execution may affect performance. For instance, random access across many different pages would be substantially slower than sequential access of parameters tightly packaged in fewer pages.

These considerations set the scene for optimizing the placement of parameters P on the non-volatile memory 12 and the execution scheduling in order to maximize performance in terms of model execution speed and memory requirements.

In an embodiment of the field device 10, the field device 10 includes a memory controller 17 configured to load model parameters of a subsequent operation group from the memory unit 12 of the field device 10 into the main memory 13 of the field device 10 in response to received load requests issued by a machine learning program implementing the machine learning model MLM and executed by the processing unit 14 of the field device 10. The memory unit storing model parameters P of the machine learning model MLM may be a non-volatile memory 12. The main memory 13 for which the program running on the processing unit 14 reads data (e.g., the parameters for the currently executed operation group) forms part of the target field device 10. Further, there may be a storage memory (which may be non-volatile) which is used to store the parameters long-term. The program may not be directly read from the storage memory. Therefore, the contents from the storage memory that are needed for execution are transferred first to the main memory 13 in response to load requests. With the method, the transfer of the necessary contents such as loading the parameters is scheduled so that the total amount of main memory 13 used at any given time is reduced. In a possible embodiment, the main memory 13 may be formed by a random-access memory RAM, for example SRAM or DRAM. The main memory 13 may also be formed by a non-volatile RAM (nvRAM) or by a flash memory e.g., NOR flash memory. The non-volatile memory 12 may be a NAND flash memory. It may be also formed by other types of flash memories, e.g., NOR flash memory. The non-volatile memory 12 may be located in the target field device 10 as illustrated in FIG. 5 or located externally and connected to the target field device 10 as illustrated in FIG. 6. It may be formed by memory card such as an SD card, MMC card, CFAST card or a USB drive or it may be formed by a hard drive.

In a possible embodiment of the method, for a given trained machine learning model MLM to be deployed on a field device 10 a set of execution configurations EC is calculated prior to deployment. This set of execution configuration may include a placement of operation nodes of the machine learning model MLM into operation groups of basic operations, a schedule or a sequence of execution of the operation nodes and/or operation groups, a selection of the amount of input and/or output batching to be performed between operation nodes and/or a location on the device's non-volatile memory for the parameters corresponding to operation nodes on each operation group.

The calculation of execution configuration may be performed taking into account the topology of the graph (dependencies between operation nodes), a limit of total program memory available and the execution latency. The calculation may further take into account a load time from the non-volatile memory 12 (for different block sizes) on the target field device 10 and/or the execution time for each operation node on the target field device 10.

The calculation may be designed to provide execution configurations that guarantee the following: the amount of memory required at any given times does not exceed the memory limit set. In practice, this requires that the amount of memory required for the parameters of any two consecutive groups does not exceed a certain allocated amount of parameter memory. Further, the execution configurations guarantee that the latency requirements are met.

Within those constraints, the execution configurations are selected that maximize performance. Accordingly, the amount of CPU idle time (or wait time while parameters are loaded from the non-volatile memory 12) is minimized. The parameter placement in memory and schedule are consistent to increase performance (e.g., provide sequential access to blocks if this improves the read throughput).

The program may be deployed on the target field device 10 to a non-volatile memory 12. It is deployed together with the model parameters, placed on specific locations. Additionally, the program contains information about other execution configurations such as schedule and/or batching. The deployment may be done via a network interface or an external memory card may be connected to the device for copying the program and parameters.

During execution, the program is loaded into the main memory 13 and performs a series of operations as required by the operation nodes according to the schedule provided and issues a series of requests to load coefficients from the non-volatile memory 12, also according to the schedule. These requests may be handled by the non-volatile memory controller in parallel to the program execution by the processing unit 14. That is, while the processing unit 14 is performing operations using a given set of parameters, a transfer of the next set of parameters from the non-volatile memory 12 to the main memory 13 may be performed in parallel.

Figure 7:
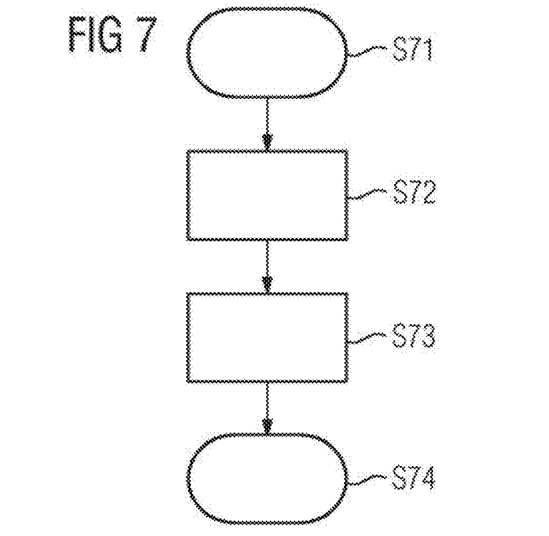
FIG. 7 depicts an example of a flowchart for illustrating a program initialization in a field device.
Figure 8:
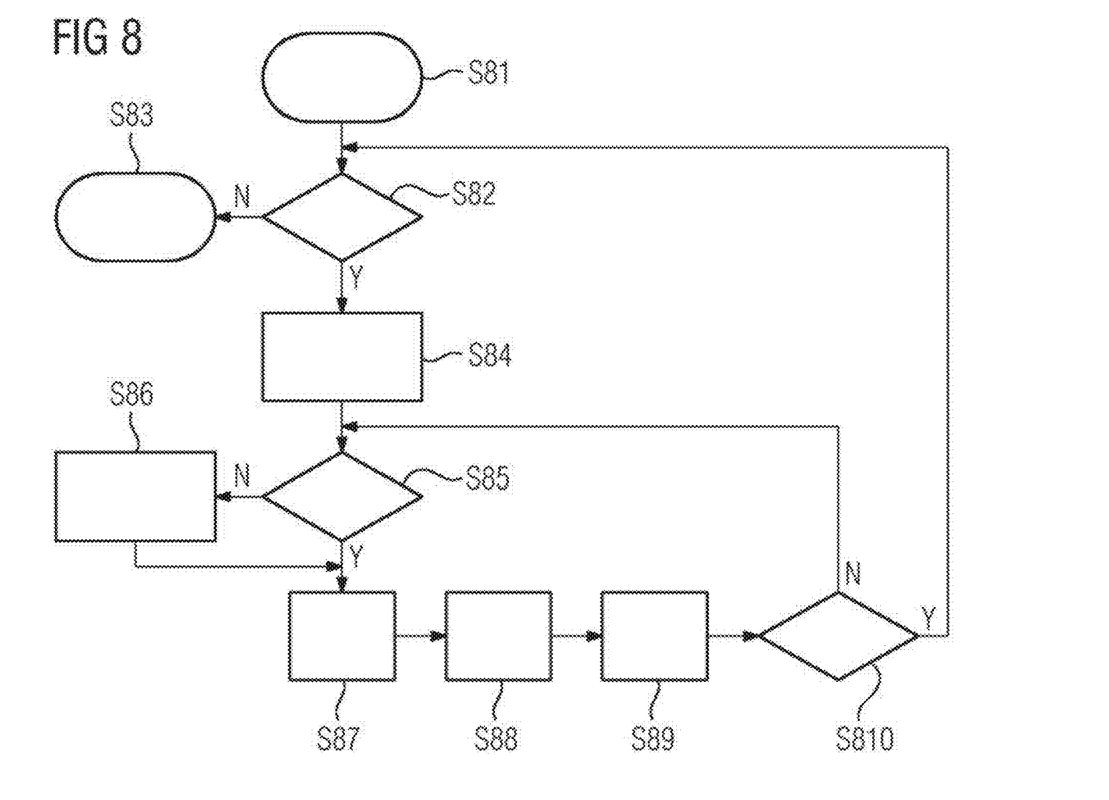
FIG. 8 depicts an example of a flow diagram for illustrating a program execution within a field device.

A flowchart showing how the program executed by the target field device 10 according to the method may be structured is illustrated in FIGS. 7, 8. FIG. 7 illustrates an initialization sequence while FIG. 8 illustrates the model execution on the CPU 14 of the target field device 10.

In the illustrated exemplary embodiment, the initialization sequence includes four acts S71, S72, S73, S74. After starting in act S71, an indicator n is initialized to be 0. n is indicating the current operation group in the schedule. In act S73, a request to load parameters of operation group 0 is issued. The initialization sequence ends in act S74.

After initialization, the model execution may be performed by the processing unit 14 of the target field device 10 as illustrated in the flow diagram of FIG. 8. The model execution starts in act S81.

In act S82, it is checked whether input data is available to the machine learning model MLM or not. If there is no input data, the model execution stops in act S83. If input data is available, the input data is fetched in act S84. In act S85, it is checked whether the parameters P of the operation group n have been loaded. If not, the process waits in act S86 for the parameters P to be loaded and optionally other tasks are processed by the CPU 14. If, in act S86, the parameters P of group n have been loaded, in act S87 it is requested to load parameters P of the next operation group (n+1) according to the schedule. Then, in act S88, a node group n is processed. In act S89, n is incremented as follows: n=(n+1) mod N, wherein N is the number of operation groups. In act S810, it is checked whether n is 0 or not. If n is not 0, the process returns to act S85. If n becomes 0, the process returns to act S82 as illustrated in FIG. 8. The flow diagram of FIG. 8 describes the behavior of the program on each cycle (for example on each PLC scan cycle). The flow includes two loops, (e.g., an outer loop through the available inputs of the machine learning model MLM and an inner loop through all node groups), performing loading and execution acts in parallel.

The exemplary simplified machine learning model MLM as illustrated in FIG. 4 has specific memory requirements or model parameters and requirements for an execution time on a particular target device 10 as given in Table 1.

| Node | Param. | Exec. Time |
|------|--------|------------|
| 1 | 10 kB | 12 us |
| 2 | 20 kB | 13 us |
| 3 | 10 kB | 5 us |
| 4 | 10 kB | 10 us |
| 5 | 10 kB | 8 us |
| 6 | 10 kB | 10 us |
| 7 | 25 kB | 25 us |
| 8 | 22 kB | 14 us |
| 9 | 15 kB | 10 us |

-continued

| Node | Param. | Exec. Time |
|---|---|---|
| 10 | 15 kB | 15 us |
| 11 | 28 kB | 24 us |
| Total | 175 kB | 146 us |

In this case, the best scenario for execution time of the model for a given input is 146 µs. That would be the case if all parameters of the model are in memory occupying a memory space of 175 kB and no loading of parameters P is required. It is, however, possible to optimize the execution so that much less memory is utilized, with a minimal penalty on the execution time. In the given example, the target device 10 includes a NAND flash non-volatile memory 12 where the page size is 16 kB and a page may be loaded to the main memory 13 of the target device 10 within 50 µs. It is possible to place the operation nodes of the model into groups, for example as indicated in Table 2.

| Group | Nodes | Mem. Position | Schedule | Batch |
|---|---|---|---|---|
| Group 1 | 1, 2 | Block A | Step 1 | 4 |
| Group 2 | 3, 4, 5 | Block B | Step 2 | 4 |
| Group 3 | 6, 8 | Block C | Step 3 | 4 |
| Group 4 | 7 | Block D | Step 4 | 4 |
| Group 5 | 9, 10 | Block E | Step 5 | 4 |
| Group 6 | 11 | Block F | Step 6 | 4 |

In the given case, the grouping is such that the parameters in an operation group fit in two pages (32 kB). Loading from the non-volatile memory 12 the parameters for an operation group takes approximately 100 µs, and processing the group takes 25 µs in a worst case. For these values, an execution strategy would be to use just 64 kB of the main memory 13 (the equivalent of four pages) where at any given time two of them are being used by the running program processing a given group of nodes, and another two are being loaded with the parameters for the next or subsequent operation group.

When employing the method executed by machine learning model MLM on the field device 10, the wait time while operation parameters are being loaded is minimized. The minimum may be achieved when the execution time of the current group is the same as the loading time of the next group. This may be tuned, for example, via batching of many inputs. Assuming that the overhead for storing an additional set of intermediate elements is small compared to the amount of parameters of the operation nodes and that a latency of up to 1 ms is acceptable for a model input to be processed it is possible to batch four inputs together to have a worst case execution time for a group of 100 µs, comparable with the time to load parameters of each group.

This makes it possible to provide an efficient schedule where a load operation for the next group to be scheduled is triggered and then the nodes of the current group are being evaluated while the load process is carried out.

Figure 9:
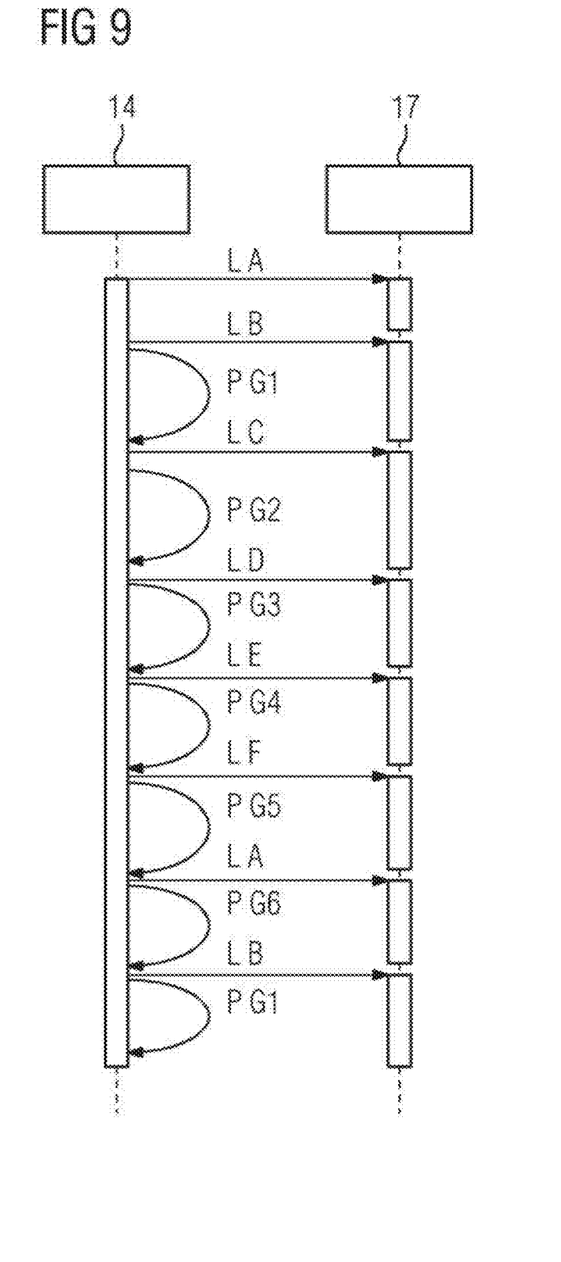
FIG. 9 depicts an example of a sequence diagram for illustrating the execution of machine learning model.

This is depicted in the sequence diagram of FIG. 9.

Figure 10:
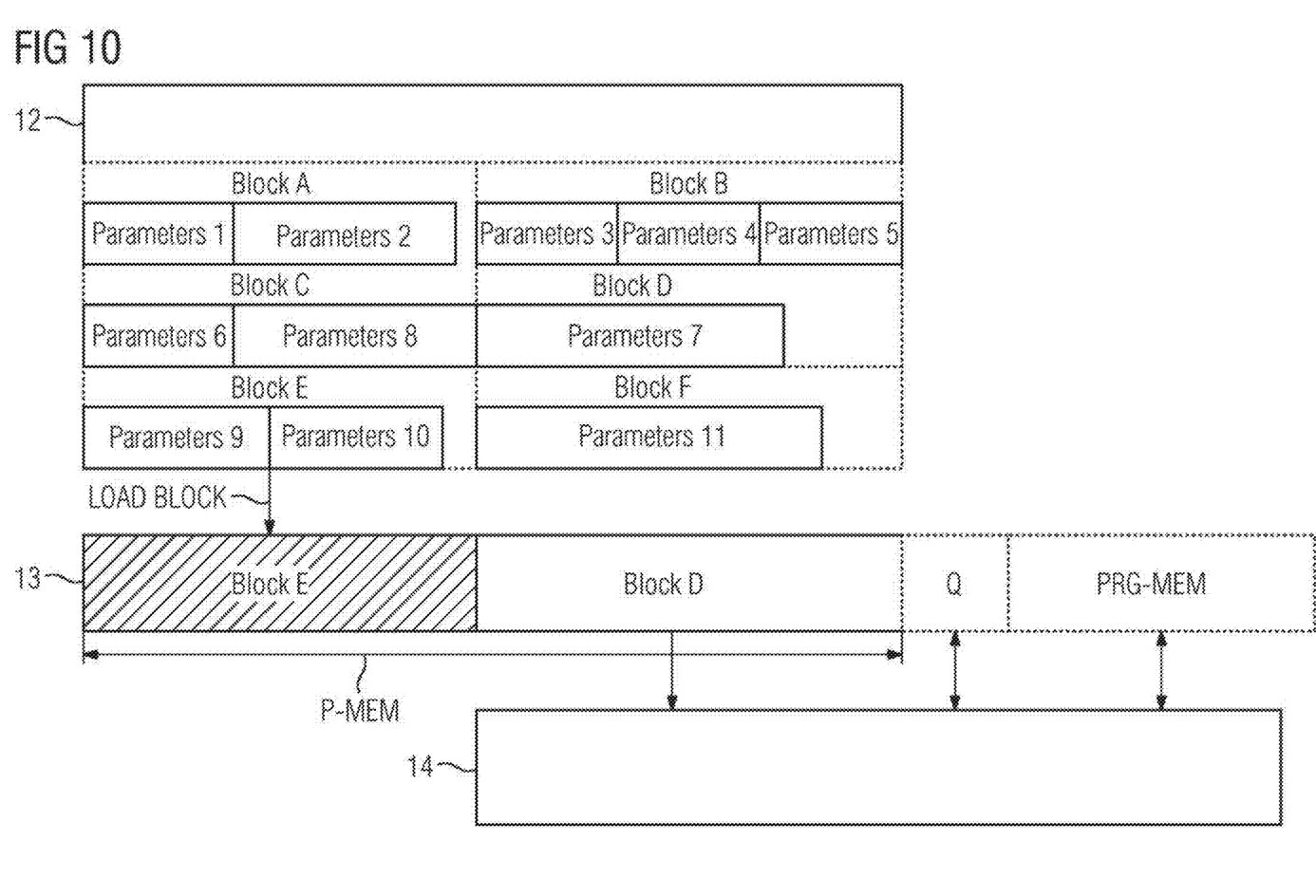
FIG. 10 depicts an example of a diagram for illustrating a program memory use and data transfer as employed by a field device.

Further, FIG. 10 depicts the state of memory in the given example during execution of nodes in group 4, while loading of parameters of nodes in group 5. In a steady state, the system processes four different inputs applied to the model in approximately 600 µs, that is, on average 150 µs, adding a very small overhead compared to the best case where all parameters are in the memory at once (146 µs). The scheduling does not exceed the latency requirement and uses a reduced amount of memory, e.g., 64 kB for parameters and a small overhead for queues.

FIG. 9 illustrates the interaction between the processing unit 14 and the memory controller 17 of a target device 10. The load requests are issued by a machine learning program running on the processing unit 14. A component of the program may be in charge of implementing the schedule, e.g., coordinate the execution of operation groups and the loading of operation parameters according to the schedule. As may be seen in FIG. 9, the basic operations of an operation group are executed by performing processing of data with the loaded parameters by the CPU 14 while in parallel normal parameters of a subsequent operation group are loaded by the memory controller 17.

As illustrated in FIG. 10, the non-volatile memory 12 of the target device 10 stores the parameters P of the machine learning model MLM illustrated in FIG. 4. In the illustrated example the machine learning model MLM of FIG. 4 includes eleven operation nodes N with associated operation parameters P. The parameters P such as weighting coefficients or the different operation nodes N of the machine learning model MLM are stored in memory blocks A to F of the non-volatile memory 12 as illustrated in FIG. 10. The grouping is such that the parameters P in a group fit in two pages (32 kB). For instance, the operation nodes 1, 2 of the machine learning model MLM of FIG. 4 require 10 kB plus 20 kB, (i.e., less than 32 kB), and may be stored in block A of the non-volatile memory 12 as illustrated in FIG. 10. Similar, operation nodes 3, 4, 5 of the machine learning model MLM require 10 kB plus 10 kB plus 10 kB of memory space and may be stored in block B of the non-volatile 12 together. In the illustrated example of FIG. 10 the main memory 13 includes a parameter memory space for two blocks, block E and block D in the give example. Further, the main memory 13 has additional memory space for the queues Q of the machine learning model MLM and may include a fixed program memory including instructions and data. The central processing unit CPU 14 of the target device 10 has direct access to the main memory 13 as illustrated in FIG. 10. In the illustrated example, the parameters of block E, (e.g., group 5 including nodes 9, 10), are loaded while parameters P of block D are processed by the processing unit 14. Accordingly, the basic operations of the operation group related to operation node 7 of the machine learning model (loaded from block D of non-volatile memory 12) are executed while at the same time parameters P of a subsequent operation group 5 including operation nodes 9, 10 of the machine learning model MLM are loaded from block E of the non-volatile memory 12.

The method is configured to process, store and evaluate machine learning models MLM on target field devices 10 in such a way that the amount of main memory 13 required is reduced. This makes it possible to evaluate large machine learning models MLM or making execution of small machine learning models MLM more efficient. Further, the method for executing a machine learning model on a field device 10 does minimize the idle time waiting for parameters P to be loaded, that is it reduces the overhead added when compared to an ideal scenario (having all parameters stored in the main memory 13).

On deployment, the operations in a machine learning model MLM may be grouped and the corresponding parameters P of each group may be stored in the non-volatile memory 12 in specific locations. During execution, a predetermined schedule is followed such that the execution of a group of operations and the loading of the parameters P of the next group into the main memory 13 may be performed in parallel.

It is to be understood that the elements and features recited in the appended claims may be combined in different ways to produce new claims that likewise fall within the scope of the present disclosure. Thus, whereas the dependent claims appended below depend from only a single independent or dependent claim, it is to be understood that these dependent claims may, alternatively, be made to depend in the alternative from any preceding or following claim, whether independent or dependent, and that such new combinations are to be understood as forming a part of the present specification.

While the present disclosure has been described above by reference to various embodiments, it may be understood that many changes and modifications may be made to the described embodiments. It is therefore intended that the foregoing description be regarded as illustrative rather than limiting, and that it be understood that all equivalents and/or combinations of embodiments are intended to be included in this description.

The invention claimed is:

1. A method for deployment of a machine learning model on a target field device, the method comprising:
    automatically generating a set of source code files based on a trained machine learning model, wherein the set of source code files is configured to execute the machine learning model according to predetermined capabilities of the target field device, and wherein the machine learning model is represented by a serialized model comprising a text or binary string which encodes a graph topology including nodes, operation of nodes, interconnection of nodes, and parameter of nodes;
    transforming the generated source code files into a model binary using a tool chain specific to the target field device; and
    deploying the model binary in a memory of the target field device.

2. The method of claim 1, wherein the machine learning model is parsed by a model parser to automatically generate at least one source code file and to extract parameters of the machine learning model.

3. The method of claim 2, wherein the extracted parameters of the machine learning model are included into a source code of at least one generated source code file as constants and/or static variables.

4. The method of claim 2, wherein the extracted parameters of the machine learning model are included into a separate parameter binary deployed along with the model binary in the memory of the target field device.

5. The method of claim 2, wherein the extracted parameters of the machine learning model are included into a separate parameter file, which is transformed into a parameter binary using the tool chain specific to the target field device, and
    wherein the parameter binary is combined with the model binary for deployment in the memory of the target field device.

6. The method of claim 5, wherein the model binary and/or the parameter binary are deployed locally by copying the model binary and/or the parameter binary into the memory of the target field device or remotely by copying the model binary and/or the parameter binary via a network and a network interface of the target field device into the memory of the target field device.

7. The method of claim 2, wherein the machine learning model is trained with training data and/or tested with test data.

8. The method of claim 2, wherein the machine learning model is parsed by the model parser having access to a data source comprising a set of libraries and device compatible operation modules of the target field device.

9. The method of claim 2, wherein the model binary and a parameter binary are stored in the memory of the target field device and loaded into a main memory of the target field device for execution by at least one processing unit of the target field device.

10. The method of claim 1, wherein the machine learning model is trained with training data and/or tested with test data.

11. The method of claim 1, wherein the machine learning model is parsed by a model parser having access to a data source comprising a set of libraries and device compatible operation modules of the target field device.

12. The method of claim 1, wherein the model binary and a parameter binary are stored in the memory of the target field device and loaded into a main memory of the target field device for execution by at least one processing unit of the target field device.

13. The method of claim 1, wherein, prior to the transforming of the generated source code into the model binary, the generated source code is integrated with other device source code.

14. The method of claim 1, wherein the model binary and/or the parameter binary are deployed locally by copying the model binary and/or the parameter binary into the memory of the target field device or remotely by copying the model binary and/or the parameter binary via a network and a network interface of the target field device into the memory of the target field device.

15. A deployment system for deployment of a machine learning model on a target field device, the deployment system comprising:
    a model parser stored in one or more memories of the deployment system, wherein the model parser is configured to parse the machine learning model to generate at least one source code file configured to execute the machine learning model using available resources of the target field device; and
    a tool chain stored in one or more memories of the deployment system, wherein the tool chain is specific to the target field device and is configured to transform the at least one source code file into a model binary for deployment in a memory of the target field device,
    wherein the model parser is configured to extract parameters of the machine learning model and to include the parameters into a separate parameter binary, which is deployed along with the model binary in the memory of the target field device.

16. The deployment system of claim 15, wherein the model parser has access to a database comprising a set of libraries and device-compatible operation modules of the target field device.

17. The deployment system of claim 15, wherein the model parser is configured to extract parameters of the machine learning model and include the parameters into a source code of the at least one generated source code file as constant variables, static variables, or a combination thereof.

18. A deployment system for deployment of a machine learning model on a target field device, the deployment system comprising:

a model parser stored in one or more memories of the deployment system, wherein the model parser is configured to parse the machine learning model to generate at least one source code file configured to execute the machine learning model using available resources of the target field device; and a tool chain stored in one or more memories of the deployment system, wherein the tool chain is specific to the target field device and is configured to transform the at least one source code file into a model binary for deployment in a memory of the target field device, wherein the model parser is configured to extract parameters of the machine learning model and to include the parameters into a separate parameter file, which is transformed into a parameter binary using the tool chain specific to the target field device, and wherein the parameter binary is deployed along with the model binary in the memory of the target field device.

19. The deployment system of claim 18, wherein the model parser has access to a database comprising a set of libraries and device-compatible operation modules of the target field device.

20. The deployment system of claim 18, wherein the model parser is configured to extract parameters of the machine learning model and include the parameters into a source code of the at least one generated source code file as constant variables, static variables, or a combination thereof.

* * * * *